United States Patent
Ajioka

(10) Patent No.: US 8,988,813 B2
(45) Date of Patent: Mar. 24, 2015

(54) MICROWAVE-ASSISTED MAGNETIC RECORDING AND REPRODUCING DEVICE

(71) Applicant: TDK Corporation, Tokyo (JP)

(72) Inventor: Eriko Ajioka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/281,253

(22) Filed: May 19, 2014

(65) Prior Publication Data

US 2014/0340781 A1  Nov. 20, 2014

(30) Foreign Application Priority Data

May 20, 2013  (JP) ................. 2013-106261

(51) Int. Cl.
| | | |
|---|---|---|
| G11B 5/02 | (2006.01) | |
| G11B 5/48 | (2006.01) | |
| G11B 5/012 | (2006.01) | |
| G11B 5/00 | (2006.01) | |

(52) U.S. Cl.
CPC ........ G11B 5/012 (2013.01); *G11B 2005/0024* (2013.01)
USPC .......................................... 360/59; 360/244.1

(58) Field of Classification Search
CPC .............. G11B 2005/0021; G11B 2005/0005; G11B 5/314; G11B 5/486; G11B 5/4833; G11B 5/4853
USPC .................. 360/59, 244.1, 245.8, 245.9, 272; 369/13.13, 13.33, 13.26
See application file for complete search history.

(56) References Cited

U.S. PATENT DOCUMENTS

| | | | |
|---|---|---|---|
| 7,701,674 B2 | 4/2010 | Arai | |
| 8,248,732 B2 | 8/2012 | Nishiyama et al. | |
| 8,305,712 B2 | 11/2012 | Contreras et al. | |
| 8,587,903 B2 * | 11/2013 | Ajioka et al. | ............ 360/244.1 |
| 2011/0090603 A1 | 4/2011 | Bai | |

FOREIGN PATENT DOCUMENTS

| | | |
|---|---|---|
| JP | A-2003-151114 | 5/2003 |
| JP | B2-4330580 | 9/2009 |
| JP | A-2009-266334 | 11/2009 |
| JP | A-2010-073297 | 4/2010 |
| JP | B2-4590003 | 12/2010 |
| JP | A-2011-090767 | 5/2011 |
| JP | A-2011-134434 | 7/2011 |

OTHER PUBLICATIONS

Zhu et al., "Microwave Assisted Magnetic Recording (MAMR)," The Magnetic Recording Conference (TMRC), 2007, pp. 34-35, Paper B6.

* cited by examiner

*Primary Examiner* — Nabil Hindi
(74) *Attorney, Agent, or Firm* — Oliff PLC

(57) ABSTRACT

A microwave-assisted magnetic recording and reproducing apparatus includes a microwave power generator, a microwave magnetic field generating element, and a thin film magnetic head that may record a data signal in high density in a magnetic recording medium that has a high coercivity. A magnetic recording medium, a magnetic head that records information in the magnetic recording medium, a microwave power generator provided independently of the magnetic head, and a differential signal supply unit used to supply microwave power generated by the microwave power generator as differential signals to a microwave magnetic field generating element provided at the magnetic head are included.

8 Claims, 12 Drawing Sheets

MICROWAVE-ASSISTED MAGNETIC RECORDING AND REPRODUCING DEVICE

BACKGROUND

The present invention relates to a microwave-assisted magnetic recording and reproducing apparatus provided with a microwave power generator and a thin film magnetic head including a microwave transmission line.

It is desired to increase a recording density of a magnetic recording medium, which is a magnetic recording device. In order to keep a signal quality (an S/N ratio) necessary for high-density recording, as a areal recording density is increased, it is necessary to make magnetic particles be smaller that constitute a magnetic recording medium. However, magnetic particles that have been made smaller tend to lose magnetization because of thermal fluctuations. In order to prevent this and keep a stable recording state, it is necessary to increase magnetic anisotropy energy (Ku) of magnetic particles. The strength of a magnetic field to reverse the magnetization of magnetic particles having uniaxial magnetic anisotropy is called an anisotropic magnetic field (Hk), which is expressed using saturation magnetization (Ms) and magnetic anisotropy energy (Ku) as Hk=2Ku/Ms. Thus, in the case where a material having a high Ku is used, Hk is increased and a higher recording magnetic field is necessary to perform recording on a magnetic recording medium. In contrast, as an areal recording density is increased, the size of a recording head element is reduced. Thus, the strength of a magnetic recording field that may be generated decreases proportionately with the size of a recording head element. As a result, recording to be performed on the magnetic recording medium becomes difficult.

To perform magnetization reversal of a recording film that has smaller grain and whose magnetic anisotropy energy (Ku) is high, the recording head element of a thin film magnetic head needs to apply an abrupt recording magnetic field having, at maximum, a strength of the order of the anisotropic magnetic field (Hk) of the recording film. In a magnetic disk drive (Hard Disc Drive: HDD) that has become commercially practical using a perpendicular magnetic recording method, a recording head element using a so-called monopole is used and a recording magnetic field is applied to a recording film in a perpendicular direction from a surface of an air bearing surface (Air Bearing Surface: ABS) of the recording head element. The strength of this perpendicular recording magnetic field is proportional to a saturation magnetic flux density (Bs) of a soft magnetic material that constitutes the monopole, and thus a material having a saturation magnetic flux density (Bs) that is made as high as possible has been developed and has become commercially practical. However, as a saturation magnetic flux density (Bs), Bs=2.4 T (tesla) is practically the upper limit from a so-called Slater-Pauling curve, and a value obtained under present circumstances is approaching the practical limit. In addition, the thickness and width of a monopole currently used is on the order of about 100 nm to 200 nm; however, in the case where a recording density is increased, it is necessary to further reduce the thickness and width. As a result, a perpendicular magnetic field to be generated is further reduced.

In this manner, under present circumstances, it is becoming more difficult to achieve higher density recording because of the limit of the recording capability of a recording head element. In order to solve this technical problem, energy assisted recording has been proposed in which, when recording is performed, energy is applied to a magnetic recording medium in an auxiliary manner and a magnetic field strength necessary for signal recording is reduced.

A recording method using a microwave magnetic field as an auxiliary energy source is called a microwave assisted magnetic recording (Microwave Assisted Magnetic Recording: MAMR). (Non-Patent Literature 1)

CITED REFERENCES

Patent References

[Patent Literature 1] Japanese Patent No. 4590003
[Patent Literature 2] Japanese Unexamined Patent Application Publication No. 2011-90767
[Patent Literature 3] Japanese Unexamined Patent Application Publication No. 2011-134434
[Patent Literature 4] Japanese Patent No. 4330580
[Patent Literature 5] Japanese Unexamined Patent Application Publication No. 2010-073297
[Patent Literature 6] Japanese Unexamined Patent Application Publication No. 2003-151114
[Patent Literature 7] Japanese Unexamined Patent Application Publication No. 2009-266334
[Non-Patent Reference]
[Non-Patent Literature 1] J. G. Zhu and X. Zhu, 'Microwave Assisted Magnetic Recording', The Magnetic Recording Conference (TMRC) 2007 Paper B6 (2007)

SUMMARY

In microwave assisted magnetic recording, a method in which a microwave magnetic field is supplied by a microwave oscillator arranged at the tip of a magnetic head and a method in which microwave power supplied from a microwave power generator that is independent of a magnetic head is supplied to a microwave magnetic field generating element are known. As the former, a method using a spin-torque oscillator (spin-torque oscillator: STO) is well known. (Patent Literature 1) The latter is called an externally oscillated MAMR method. This is a method in which, when magnetic recording is performed, energy assistance is performed by supplying a microwave current (power) supplied from a microwave power generator to a microwave magnetic field generating element formed near a recording head element of a magnetic head slider and by causing the microwave magnetic field generating element to generate a microwave magnetic field.

The frequency of microwave power necessary for this energy assistance depends on the configuration of a magnetic recording layer and is assumed to be in a range of 5 GHz to 50 GHz. (Patent Literature 2)

In an externally oscillated MAMR method, unlike in an STO method, microwave power from a microwave power generator needs to propagate through a transmission line formed on a suspension that supports a head slider and needs to be supplied to a microwave magnetic field generating element formed near a recording head element.

Conventionally, for a suspension, an insulating layer and transmission lines including a plurality of wiring lines are formed on a flexure, which is to be a base, the wiring lines including a recording signal transmission line, a reproducing signal transmission line, a sensor line, a heater line, and the like.

Generally, a microstrip transmission line is used in which a wiring line is used as a transmission line and a flexure is used as a ground electrode (GND). Patent Literature 3 illustrates a cross-sectional view of a microstrip transmission line in a conventional example. (Patent Literature 3)

Also in an externally oscillated MAMR method, as a method for transmitting microwave power, a method is known in which a transmission line is arranged on this suspension and a flexure is used as a ground electrode (GND). For the flexure, a configuration in which high conductive and low conductive layers are arranged in a multilayer form and a configuration in which shield layers are arranged such that the shield layers are top and bottom layers are known. (Patent Literatures 4 and 5)

In either of these transmission methods, single end driving is performed in which power is input to a transmission line and a flexure is used as a ground electrode (GND).

In addition, differential driving is also known in which signals whose phases differ by 180° from each other are transmitted in two transmission lines as microwave transmission lines. (Patent Literature 7)

Power supplied to a microwave magnetic field generating element in a differential manner is denoted by Po [dBW], and the impedance of a microwave power generator viewed from the microwave magnetic field generating element by Zo [Ω]. In the case where the microwave magnetic field generating element is an ideal element having a value of resistance of 0 [Ω], Po and a maximum current i that flows in the element is expressed by a relational expression as in (Math 1).

$$i = \sqrt{\frac{10^{\frac{Po}{10}}}{Zo}} \times 2\sqrt{2}$$ [Math 1]

When forms of elements are the same, in accordance with Ampre's law as described in (Math 2), the greater the amount of current that flows through a microwave magnetic field generating element, the greater the strength of a generated magnetic field.

$$H = i/2\pi a$$ [Math 2]

(Here, H: magnetic field strength, i: current, a: the distance from the center of a conductor)

It is clear from (Math 1) and (Math 2) that, in an externally oscillated MAMR method, a higher microwave generation magnetic field is obtained by supplying power from a microwave power generator to a microwave magnetic field generating element so as not to attenuate the power as much as possible.

However, in the case where microwave power supplied from a microwave power generator is transmitted through a microstrip transmission line on a suspension, a stainless sheet having spring characteristics is generally used as a base for a flexure, which is a ground electrode of the microstrip line, in order to obtain flying characteristics of a head slider.

Generally, the conductivity of a stainless base is on the order of 1.1e6 to 1.7e6 [S/m], which is lower than the conductivity of copper used in transmission lines, which is approximately 5.8e7 [S/m]. Transmission loss occurs by using this stainless base as a ground electrode. In a conventional magnetic recording and reproducing apparatus, even for write and read signals for a recording medium that propagate through a transmission line on a suspension and whose propagation speed is fastest, the transmission speed is on the order of 800 to 900 [Mbps]. A high frequency component of a signal that corresponds to this and that propagates through a transmission line on the suspension is on the order of 5 [GHz] at highest, and thus there is not a very large difference in loss between the case where stainless having a low conductivity is used and the case where copper or gold having a high conductivity is used.

However, in a externally oscillated MAMR method, microwave power that is supplied from a microwave power generator and that is on the order of 5 to 50 [GHz], with which an MAMR effect may be expected, needs to propagate through a transmission line on a flexure. In the case where a flexure constituted by a stainless base is caused to operate as a ground electrode (GND), the amount of loss caused by this stainless base is significantly large in the case of 5 to 50 [GHz] or higher, with which an MAMR effect may be expected, especially, in a high frequency band of 10 GHz or higher. Thus, in order to supply microwave power necessary for a microwave magnetic field generating element, it is necessary to increase output power of a microwave power generator by an amount of loss that has occurred. As a result, problems occur in increased power of the microwave power generator, high power consumption, higher cost, and furthermore occurrence of heat caused by increased power and the like.

As in Patent Literature 4, a method is known in which one layer of a metal material having a high conductivity is provided on a wiring line side of a flexure base and transmission characteristics are improved. In this method, an improvement is obtained in terms of transmission loss; however, since an additional layer needs to be provided on the flexure base, cost may be increased.

In addition, as in Patent Literature 5, a configuration is known in which shield layers are arranged on the top and bottom of a flexure; however, a manufacturing process may be more complicated, cost may be increased, and spring characteristics necessary for a head gimbal assembly may be inhibited.

Furthermore, as in Patent Literature 6, since design of a suspension is important to obtain flying characteristics and spring characteristics of a head, it is difficult to provide, in all regions, shield layers necessary directly above or under a microwave transmission line that satisfies electric characteristics necessary for microwave power transmission. In particular, spring characteristics are prioritized in a region on a head-slider side of a flexure, in the region gimbal characteristics being necessary. Thus, a region appears where the flexure, which is a ground electrode, is not present on the back side of a line. As a result, the impedance of a transmission line varies greatly in this portion and reflection loss occurs.

On the basis of this, in order to solve discontinuity of impedance, as in Patent Literature 7, differential driving is also known in which signals whose phases differ by 180° from each other are transmitted through two transmission lines as microwave transmission lines. However, in Patent Literature 7, since a directional coupler is used, loss occurs in this circuit. In addition, a microwave magnetic field generating element and a write coil for performing recording on a magnetic recording medium are used together however, since requirement specifications for respective coils are different, it is impossible to use one element for two uses.

The present invention has been made in light of the above-described problems, and it is an object of the present invention to provide a microwave-assisted magnetic recording and reproducing apparatus that may suppress power consumption of a microwave power generator, that may reduce a circuit size of a microwave generator, that does not inhibit motion of a suspension, and that may achieve desired flying characteristics of a head slider.

The present invention that solves the above-described problems is a microwave-assisted magnetic recording and reproducing apparatus that includes a magnetic recording medium, a magnetic head that records information in the magnetic recording medium, a microwave power generator provided independently of the magnetic head, and a differential signal supply unit used to supply microwave power generated by the microwave power generator as differential signals to a microwave magnetic field generating element provided at the magnetic head.

Furthermore, the present invention is characterized in that the microwave power generator and the microwave magnetic field generating element are connected by microwave transmission lines, and for a ground potential of the microwave power generator and a ground potential of the microwave transmission lines and the microwave magnetic field generating element, isolation is realized in a microwave frequency range.

In addition, the microwave-assisted magnetic recording and reproducing apparatus is characterized in that in a case where the microwave power supplied from the microwave power generator is supplied as differential signals to the microwave magnetic field generating element provided at the magnetic head, a phase shift between both ends of the microwave transmission lines is within 50°.

In addition, the microwave-assisted magnetic recording and reproducing apparatus is characterized in that in a case where the microwave power supplied from the microwave power generator is supplied as differential signals to the microwave magnetic field generating element provided at the magnetic head, a power difference between both ends of the microwave transmission lines is within 2 dB.

In addition, the microwave-assisted magnetic recording and reproducing apparatus is characterized in that a frequency of the microwave power is between 5 GHz and 50 GHz.

According to the present invention, there may be obtained a microwave-assisted magnetic recording and reproducing apparatus that may suppress power consumption of a microwave power generator that may reduce a circuit size of a microwave generator, that does not inhibit motion of a suspension, and that may achieve desired flying characteristics of a head slider.

DETAILED DESCRIPTION OF EMBODIMENTS

[First Embodiment]

Figure 1:
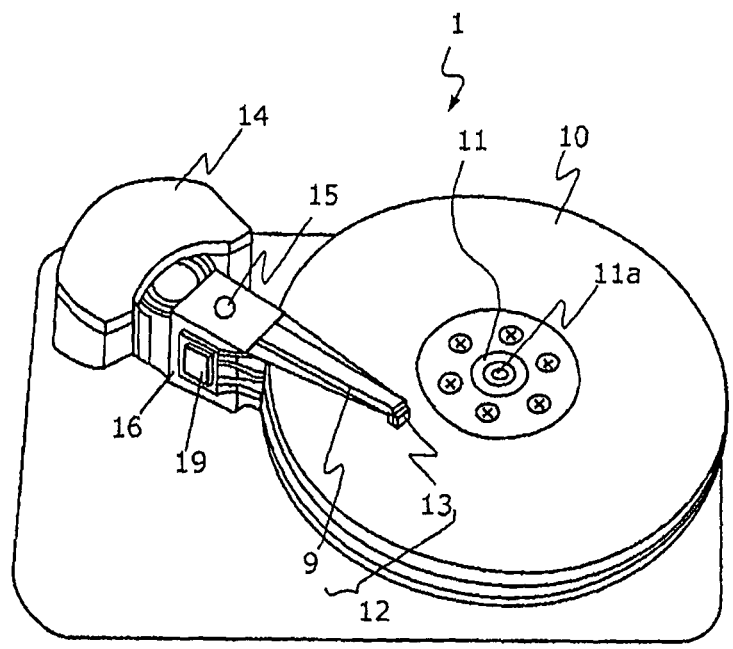
FIG. 1 is a schematic perspective view of a magnetic recording and reproducing device.

FIG. 1 illustrates a schematic perspective view of a magnetic recording and reproducing apparatus (magnetic disk drive) 1. The magnetic recording and reproducing apparatus 1 includes a plurality of magnetic recording medium (magnetic disks) 10 and a plurality of head gimbal assemblies (HGAs) 12, each of which includes a magnetic head slider 13.

An HGA 12 is constituted by a magnetic head slider 13 and a suspension 9 that supports the magnetic head slider 13. A magnetic recording medium 10 is rotated by a spindle motor 11 around a spindle motor rotation axis 11a. The magnetic head slider 13 performs recording and reproducing of a data signal on the magnetic recording medium 10.

The suspension 9 is fixed to a carriage 16, which is rotatable around a pivot bearing axis 15. The suspension 9 performs, using a VCM (voice coil motor) 14, alignment of the magnetic head slider 13 on the magnetic recording medium 10.

A microwave power generator 19 supplies microwave power to the magnetic head slider 13 when the magnetic head slider 13 operates for recording.

More specifically, the microwave power generator 19 amplifies, as needed, microwave power generated by a built-in oscillator or the like, and generates differential signals whose phases differ from each other by 180° using a differential signal supply unit 19a such as a rat race circuit, a balun, or a splitter and phase shifter.

Generated differential signals propagate, in a differential manner, through one and the other one of microwave power transmission lines 22a of FIG. 4, which will be described later, and are supplied to a microwave magnetic field generating element 43.

Furthermore, as in FIG. 1, in the case where a plurality of head gimbal assemblies are arranged, the magnetic recording and reproducing apparatus 1 has a mechanism that supplies microwave power to magnetic head sliders mounted on respective head gimbal assemblies.

Figure 2:
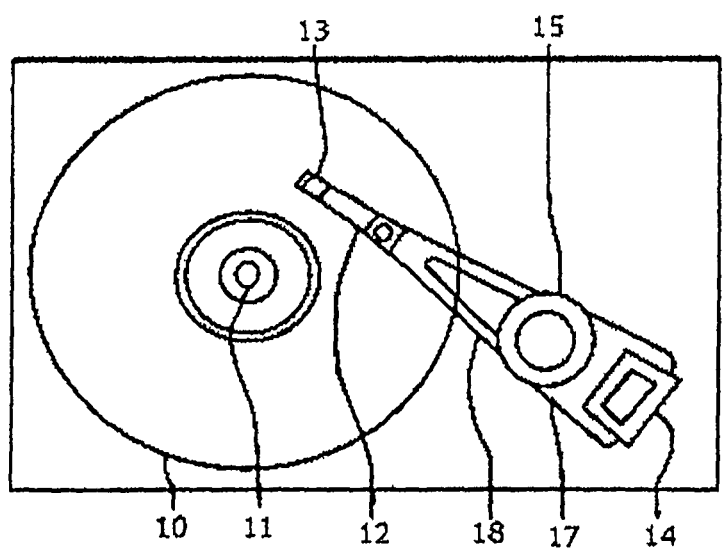
FIG. 2 is a schematic plan view of the magnetic recording and reproducing device.

The HGA 12 may be supported by a drive arm 18 as illustrated in FIG. 2. In this case, a configuration obtained by combining the HGA 12 and the drive arm 18 may be called a head arm assembly 17. In the configuration of either FIG. 1 or FIG. 2, the number of HGAs 12 is not limited, and only one magnetic recording medium 10 and one HGA 12 (and one drive arm 18) may also be provided in the magnetic recording and reproducing apparatus 1.

Figure 3:
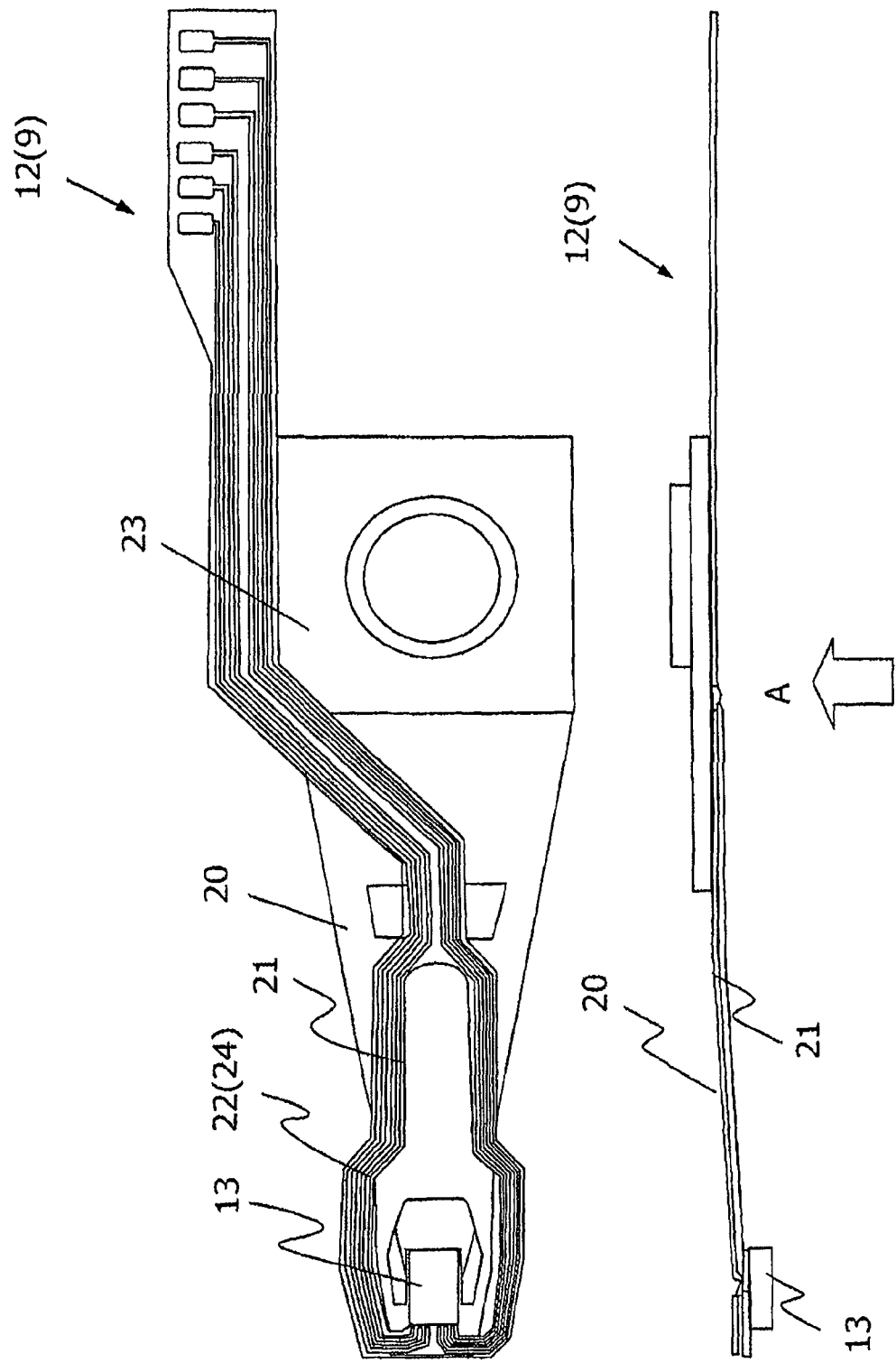
FIG. 3 is a plan view and a side view of a head gimbal assembly.

FIG. 3 is a plan view (a bottom surface diagram viewed from a magnetic recording medium side) and a side view of the head gimbal assembly 12. The head gimbal assembly 12 includes a flexure 21 and a load beam 20. The magnetic head slider 13 is attached on a one-end side of the flexure 21. The load beam 20 presses the magnetic head slider 13 against a surface of the magnetic recording medium 10 with a certain pressure. The flexure 21 is elastically deformable and has a gimbal function through which the magnetic head slider 13 is caused to follow changes on the surface of the magnetic recording medium 10. Transmission lines 22 are formed on a surface of the flexure 21. The flexure 21 is coupled to the load beam 20, and the load beam 20 is connected to the drive arm 18 via a base plate 23. In an example illustrated in FIG. 1, one microwave power generator 19 is mounted in an HSA (Head Stack Assembly) and supplies microwave power to the magnetic head sliders 13 of the head gimbal assemblies 12. However, the microwave power generator 19 and the differential signal supply unit 19a may also be mounted in each of the head gimbal assemblies 12. For example, the microwave power generator 19 and the differential signal supply unit 19a may be mounted near the base plate 23. An HSA is an assembly including a plurality of head gimbal assemblies 12 and a carriage 16.

Figure 4:
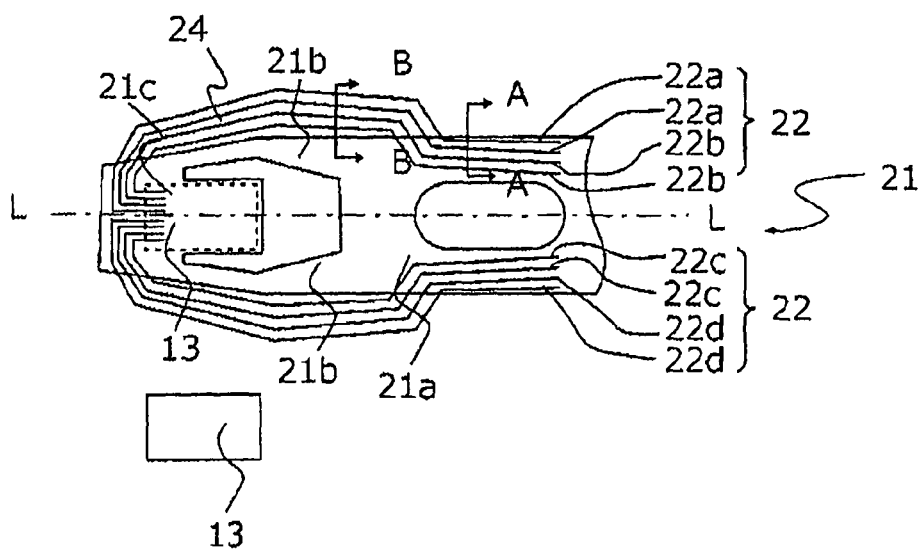
FIG. 4 is a schematic diagram illustrating the configuration of a tip portion of the head gimbal assembly.

FIG. 4 schematically illustrates the configuration of a tip portion of the head gimbal assembly 12 and a route of the transmission lines 22. FIG. 4 is an exploded bottom view of the magnetic head slider 13, the flexure 21, and the load beam 20 viewed in a direction A of FIG. 3. The flexure 21 includes a main body portion 21a, a supporting portion 21c of the magnetic head slider 13, and a coupling portion 21b, which couples the main body portion 21a to the supporting portion 21c. The coupling portion 21b is constituted by a pair of arm portions 21b, and the arm portions 21b have a lower rigidity than the main body portion 21a and the supporting portion 21c.

The transmission lines 22 include microwave power transmission lines 22a for transmitting a microwave drive current, recording signal transmission lines 22b for transmitting a recording signal to a recording head element of the magnetic head slider 13, reproducing signal transmission lines 22c for extracting a reproducing output voltage from a reproducing head element, and heater-use transmission lines 22d for adjusting a flying height. The transmission lines 22 may also include other control lines (also not illustrated) depending on functions of a magnetic head. The transmission lines 22 are typically made of copper. In addition, the microwave power transmission lines 22a are arranged such that they are lines that are next to each other.

As illustrated in FIG. 3 and FIG. 4, the transmission lines 22a, 22b, 22c, and 22d are supported between the main body portion 21a and the supporting portion 21c by a separate supporting unit 24, which is separate from the flexure 21. With this configuration, the rigidity of the arm portions 21b may be reduced and the effect on the gimbal function that the arm portions 21 have may be reduced. The separate supporting unit 24 is provided such that the separate supporting unit 24 extends between the main body portion 21a and the supporting portion 21c, and thus the effect of the separate supporting unit 24 on the gimbal function of the arm portions 21b may also be reduced.

Although not illustrated, a space between the transmission lines 22a and 22b and a top surface of the transmission lines 22a, 22b, 22c, and 22d may be covered with an insulating material such as polyimide as needed.

Figure 5:
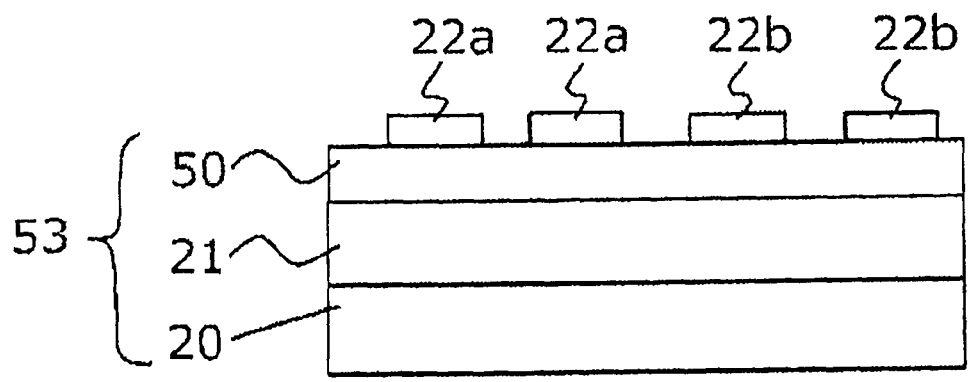
FIG. 5 is a cross-sectional view of the head gimbal assembly in FIG. 4, taken along A-A.

FIG. 5 is a cross-sectional view of FIG. 4, taken along line A-A. A multilayer configuration 53 is included in which an insulating layer 50, the flexure 21, and the load beam 20 are stacked in this order, the insulating layer 50 supporting the microwave power transmission lines 22a. The load beam 20 and the flexure 21 are formed of stainless steel having spring characteristics.

Table 1 illustrates the conductivity of representative metals.

TABLE 1

| Silver (Ag) | Copper (Cu) | Gold (Cu) | Aluminum (Al) | Nickel (Ni) | Titanium (Ti) | Stainless |
|---|---|---|---|---|---|---|
| 6.30E+07 | 5.80E+07 | 4.20E+07 | 3.70E+07 | 1.40E+07 | 2.30E+06 | 1.10E+06 to 1.70E+06 |

Unit [S/m]

Figure 7:
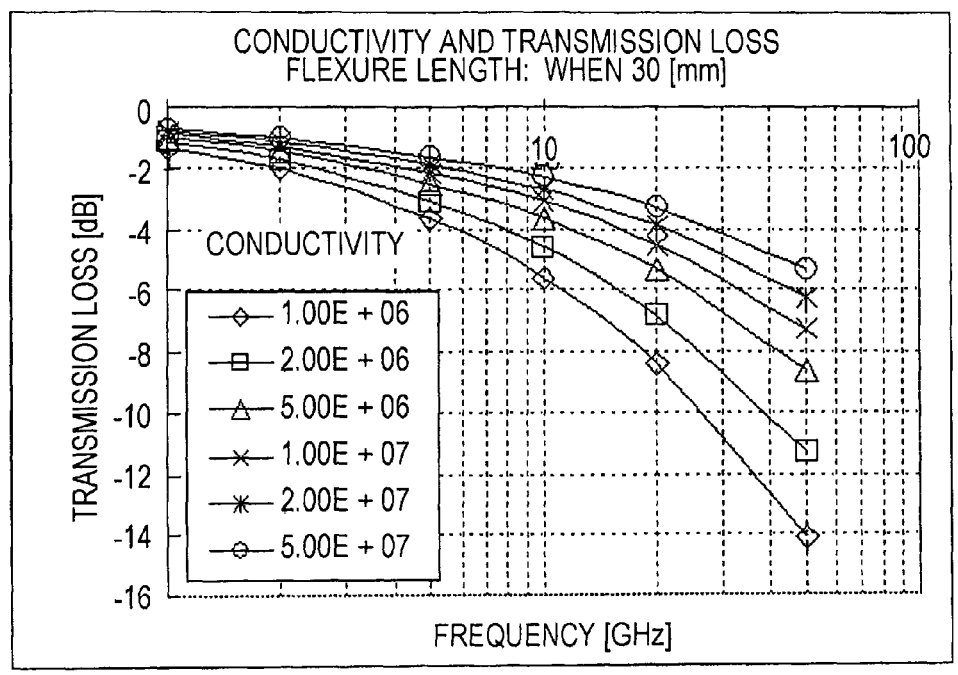
FIG. 7 illustrates frequency characteristics of transmission loss in terms of conductivity of representative metals.

FIG. 7 illustrates frequency characteristics of transmission loss in the case where one of the microwave transmission lines 22a of FIG. 4 is treated as a transmission line, the flexure 21 is treated as a ground electrode, the conductivity of the ground electrode is changed in ranges of conductivity of representative metals illustrated in Table 1, and microwave power at 50 GHz or lower, which is necessary for microwave assistance, is transmitted through a line having a length of 30 mm.

From Table 1 and FIG. 7, in the case where the flexure, which is to be a shield layer is stainless, its conductivity is 1.1 to 1.7e6 [S/m], and thus the amount of loss is significantly large in a high frequency range. As an example, in the case of 1e6 [S/m], a loss of approximately 9 [dB] is obtained at 20 GHz.

When the amount of loss is increased in this manner, a necessary microwave power is not supplied from the microwave power generator 19 to the microwave magnetic field generating element 43 positioned at a tip of a recording head element. Alternatively, power corresponding to the amount of this loss needs to be supplied by the microwave power generator 19 and a high power device is necessary. As a result, cost is increased or a problem arises that is caused by heat generated by a high power device.

Figure 6:
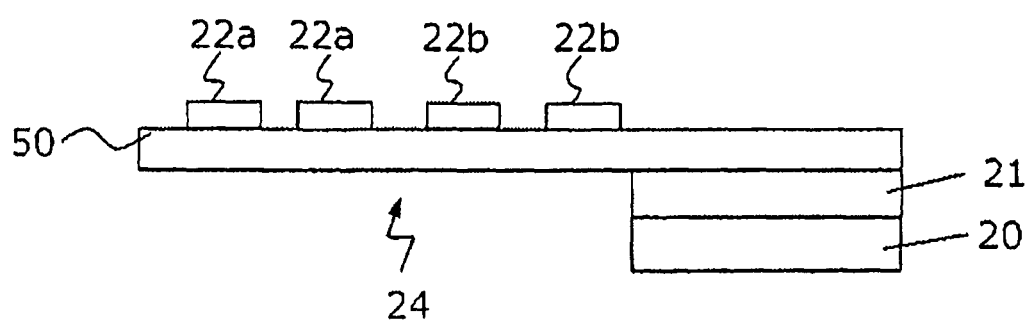
FIG. 6 is a cross-sectional view of the head gimbal assembly in FIG. 4, taken along B-B.

FIG. 6 illustrates a cross-sectional view of FIG. 4, taken along line B-B. In an area near the arm portions 21b of the flexure 21, the microwave power transmission lines 22a are supported only by the insulating layer 50, and the flexure 21 and the load beam 20, which are the cause of loss, are arranged at positions offset toward the center of a suspension from the positions of the microwave transmission lines 22a.

Figure 8:
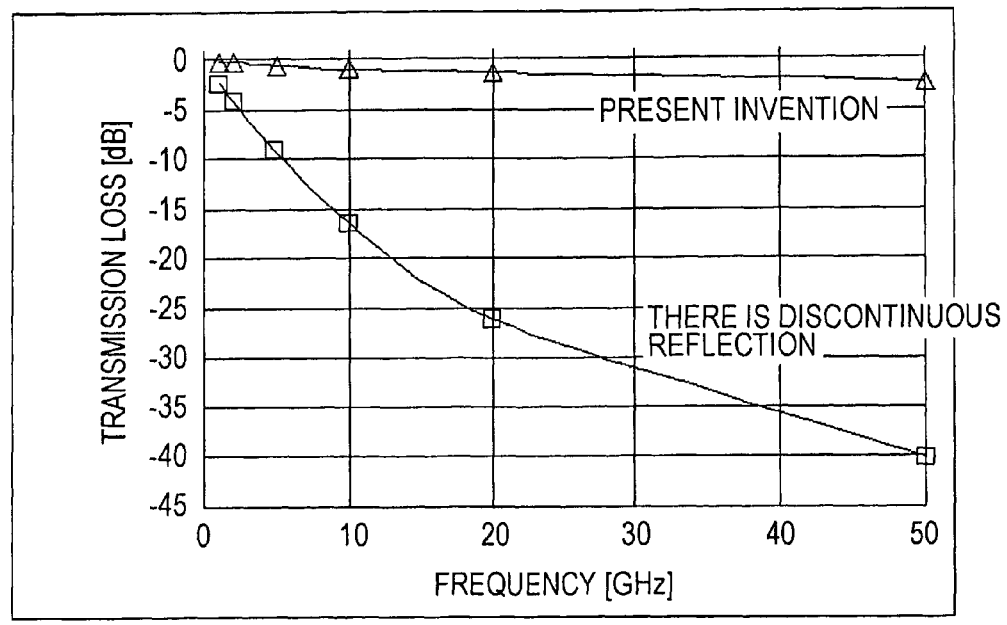
FIG. 8 illustrates a loss simulation based on presence or absence of discontinuous reflection.

In particular, in the cross section taken along B-B in FIG. 4, in the case of a single end transmission mode, an impedance mismatch is large for the microwave power transmission lines 22a for transmitting microwaves. FIG. 8 illustrates transmission characteristics in the case of an impedance mismatch. The amount of reflection loss due to an impedance mismatch is large. As an example, a loss of approximately 26 [dB] is generated at 20 [GHz]. Thus, it is difficult to transmit necessary microwave power to the microwave magnetic field generating element 43. In contrast to this, in the case of the present embodiment, since propagation occurs through two microwave transmission lines 22a in a differential driving manner, a change in impedance is small regardless of presence or absence of shield layers in the flexure 21. Thus, the amount of reflection loss is small. As an example, a loss of approximately 1.5 [dB] is obtained at 20 [GHz].

Figure 9:
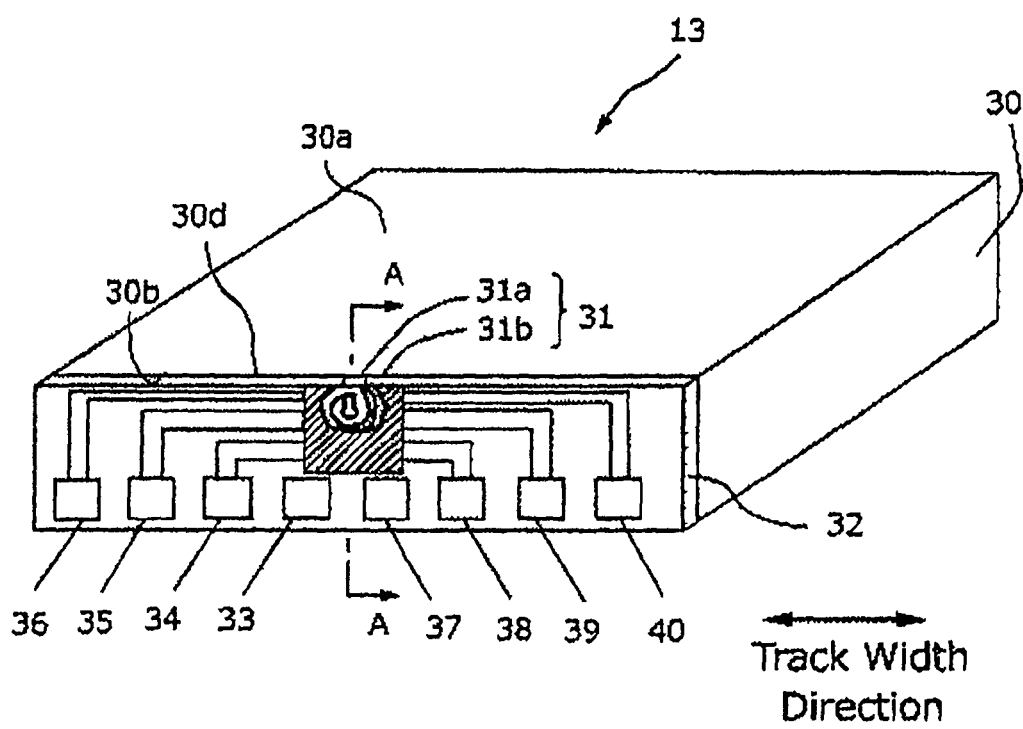
FIG. 9 is a schematic perspective view of a magnetic head slider.

FIG. 9 is a perspective view schematically illustrating the entirety of the magnetic head slider 13 in the present embodiment. The magnetic head slider 13 includes a magnetic head slider substrate 30, a magnetic head element 31, a protection layer 32, and six terminal electrodes 33, 34, 35, 36, 37, 38, 39, and 40. The magnetic head slider substrate 30 includes an ABS 30a, which has been processed so as to obtain an appropriate flying height. The magnetic head element 31 is provided on an element forming surface 30b, which is perpendicular to the ABS 30a. The protection layer 32 is provided on the element forming surface 30b so as to cover the magnetic head element 31. The six terminal electrodes 33, 34, 35, 36, 37, 38, 39, and 40 are exposed from a surface of the protection layer 32. The terminal electrodes 33, 34, 35, 36, 37, 38, 39, and 40 do not have to be at positions illustrated in FIG. 9, and may be provided at any positions in any arrangement on this element forming surface 30b.

The magnetic head slider 13 is mainly constituted by a magnetoresistive (MR) effect reproducing head element 31a for reading a data signal from a magnetic recording medium and a recording head element 31b for writing a data signal into a magnetic recording medium. The terminal electrodes 39 and 40 are electrically connected to the MR reproducing head element 31a. The terminal electrodes 35 and 36 are electrically connected to the recording head element 31b. The terminal electrodes 33 and 34 are electrically connected to the microwave magnetic field generating element 43 (FIG. 10), which will be described later.

In the present embodiment, the end of each of the transmission lines 22a, 22b, 22c, and 22d on the side of the magnetic head slider 13 is connected by ball bonding to terminal electrodes of the recording head element 31b, the reproducing head element 31a, and the microwave magnetic field generating element 43. Each of the transmission lines 22a, 22b, 22c, and 22d may be connected to the terminal electrodes by wire bonding instead of ball bonding.

An end portion of the MR reproducing head element 31a and an end portion of the recording head element 31b are positioned at the ABS 30a (more specifically, a magnetic head slider end face 30d of the ABS 30a). As a result of causing these ends of the MR reproducing head element 31a and the recording head element 31b to face a magnetic recording medium, a data signal is reproduced by receiving a signal magnetic field and a data signal is recorded by applying a signal magnetic field. A significantly thin coating of diamond-like carbon (DLC) or the like is applied for protection to the end of each element facing the ABS 30a and a portion near the end of the element.

Figure 10:
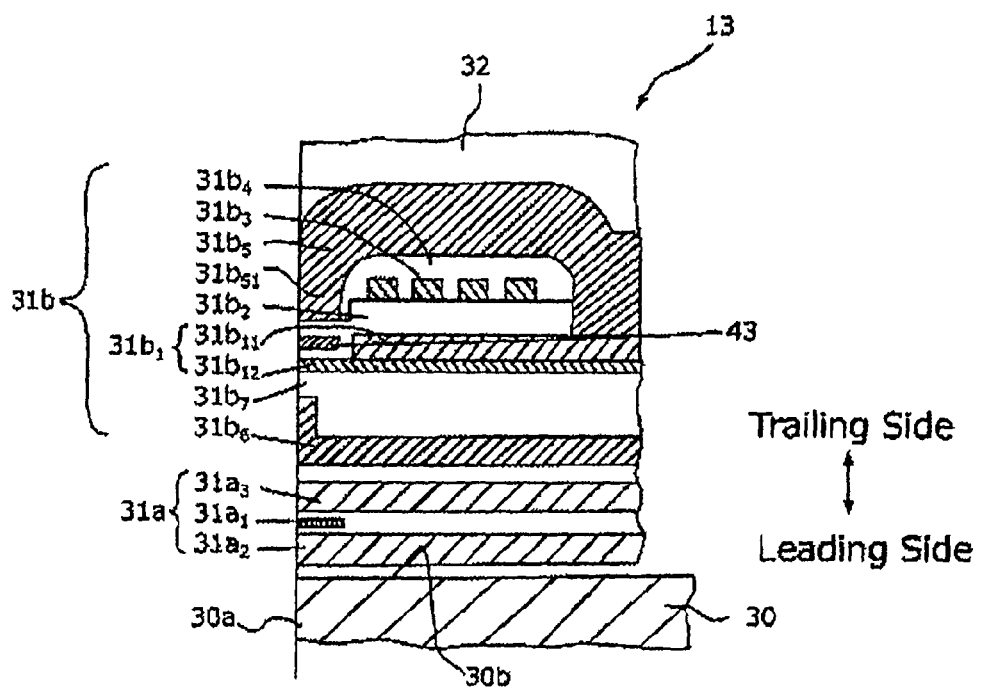
FIG. 10 is a cross-sectional view of the magnetic head slider.

FIG. 10 is a cross-sectional view of FIG. 9, taken along line A-A. The MR reproducing head element 31a, the recording head element 31b, the microwave magnetic field generating element 43, and the protection layer 32 for protecting these elements are mainly formed on the element forming surface 30b of the magnetic head slider substrate 30, which is composed of AlTiC ($Al_2O_3$—TiC) or the like.

The MR reproducing head element 31a is constituted by an MR multilayer product $31a_1$, a bottom portion shield layer $31a_2$, and a top portion shield layer $31a_3$, the bottom portion shield layer $31a_2$ and the top portion shield layer $31a_3$ being arranged at positions so as to sandwich this multilayer product. The MR multilayer product $31a_1$ includes a current-in-plane (CIP) GMR multilayer film, a current-perpendicular-to-plane (CPP) GMR multilayer film, or a TMR multilayer film, and receives a signal magnetic field from a magnetic recording medium. The bottom portion shield layer $31a_2$ and the top portion shield layer $31a_3$ prevent receiving of an effect of an external magnetic field, the external magnetic field being noise for the MR multilayer product $31a_1$.

The recording head element 31b has a configuration for perpendicular magnetic recording. Specifically, the recording head element 31b includes a main magnetic pole layer $31b_1$, a trailing gap layer $31b_2$, a write coil $31b_3$, a write coil insulating layer $31b_4$, an auxiliary magnetic pole layer $31b_5$, an auxiliary shield layer $31b_6$, and a leading gap layer $31b_7$, the write coil $31b_3$ being formed such that the write coil $31b_3$ extends between the main magnetic pole layer $31b_1$ and the auxiliary magnetic pole layer $31b_5$. The main magnetic pole layer $31b_1$ is a main magnetic pole of the recording head element 31b, and generates a write magnetic field from an end portion of the main magnetic pole layer $31b_1$ when a data signal is written, the end portion being on the side where the ABS 30a is provided.

The main magnetic pole layer $31b_1$ is a magnetic circuit for guiding, to a magnetic recording medium on which writing is to be performed, magnetic flux generated by supplying a write current to the write coil $31b_3$ such that the magnetic flux is converged. The main magnetic pole layer $31b_1$ is constituted by a main magnetic pole yoke layer $31b_{11}$ and a main magnetic pole main layer $31b_{12}$. The auxiliary magnetic pole layer $31b_5$ and the auxiliary shield layer $31b_6$ are arranged on the trailing side and the leading side of the main magnetic pole layer $31b_1$, respectively.

The end portion of the auxiliary magnetic pole layer $31b_5$ and that of the auxiliary shield layer $31b_6$ on the side where the ABS 30a is provided are a trailing shield portion $31b_{51}$ and a leading shield portion $31b_{61}$, respectively, the trailing shield portion $31b_{51}$ and the leading shield portion $31b_{61}$ having a wider layer section than the other portions. The trailing shield portion $31b_{51}$ faces the end portion of the main magnetic pole layer $31b_1$ positioned on the side where the ABS 30a is provided, via the trailing gap layer $31b_2$. In addition, the leading shield portion $31b_{61}$ faces the end portion of the main magnetic pole layer $31b_1$ on the side where the magnetic head slider end face 30d is provided, via the leading gap layer $31b_2$. By providing the trailing shield portion $31b_{51}$ and the leading shield portion $31b_{61}$ in this manner, a shunt effect of magnetic flux causes a magnetic field gradient of a recording magnetic field between the trailing shield portion $31b_{51}$ and the end portion of the main magnetic pole layer $31b_1$ and that of a recording magnetic field between an end portion of the leading shield portion $31b_{61}$ and the end portion of the main magnetic pole layer $31b_1$ to be more abrupt. As a result, jitter in a signal output becomes smaller and an error rate at the time of reproducing may be made lower.

A so-called side surface shield may also be added by appropriately processing the auxiliary magnetic pole layer $31b_5$ or the auxiliary shield layer $31b_6$ and arranging a portion of the auxiliary magnetic pole layer $31b_5$ or the auxiliary shield layer $31b_6$ near both sides of the main magnetic pole layer $31b_1$ in a track width direction. In this case, a shunt effect of magnetic flux is increased.

The microwave magnetic field generating element 43 is formed between the main magnetic pole main layer $31b_{12}$ of the main magnetic pole layer $31b_1$ and the trailing shield portion $31b_{51}$ of the auxiliary magnetic pole layer $31b_5$.

Figure 11:
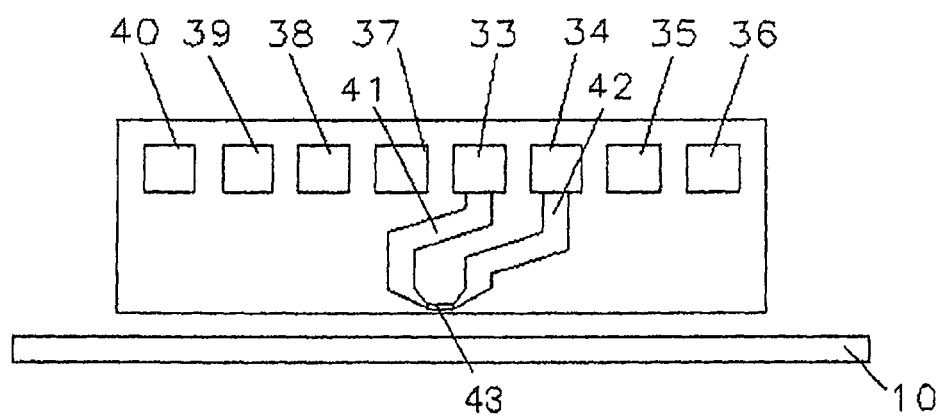
FIG. 11 is a schematic diagram of the configuration of a microwave magnetic field generating element arranged on the magnetic head slider.

FIG. 11 is a diagram of the configuration of the microwave magnetic field generating element 43, viewed from the element forming surface 30b of the magnetic head slider 13. The microwave magnetic field generating element 43, which is exposed on an ABS surface of the magnetic head slider 13, and the terminal electrodes 33 and 34 are electrically connected by wiring members 41 and 42. As a result of supplying of a microwave drive current from the terminal electrodes, the microwave magnetic field generating element 43 generates a microwave magnetic field and applies the microwave magnetic field to the magnetic recording medium 10, which is near thereto.

Figure 12:
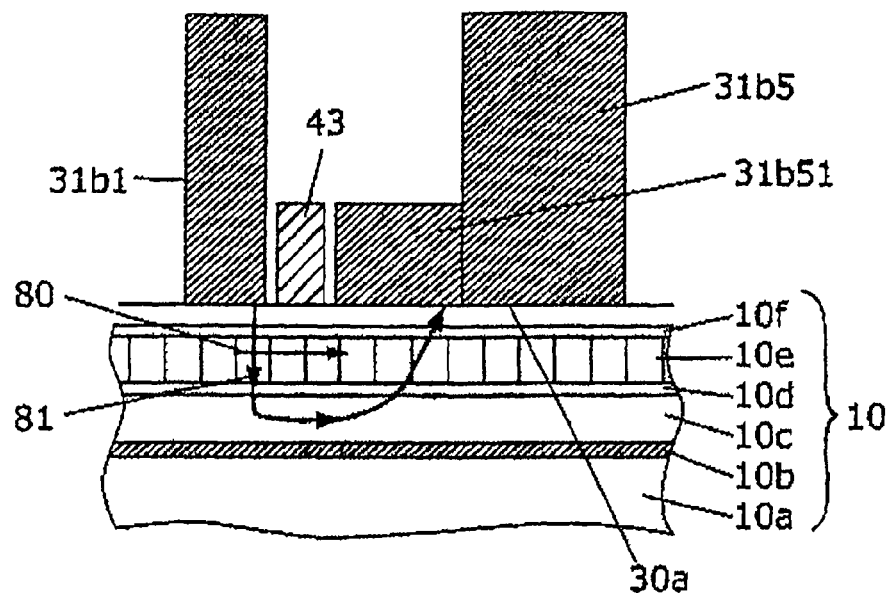
FIG. 12 is a schematic diagram for describing the theory of a microwave assisted magnetic recording method.

FIG. 12 is a cross-sectional view for describing the theory of a microwave assisted magnetic recording method. The magnetic recording medium 10 is used for perpendicular magnetic recording, and has a multilayer configuration in which a magnetization orientation layer 10b, a soft magnetic underlayer 10c which serves as a portion of a magnetic flux loop circuit, an intermediate layer 10d, a magnetic recording layer 10e, and a protection layer 10f are staked in order on a disk substrate 10a.

The magnetization orientation layer 10b gives the soft magnetic underlayer 10c magnetic anisotropy of the track width direction so as to make a magnetic domain configuration of the soft magnetic underlayer 10c be stable and reduce spike noise in a reproducing output waveform. The intermediate layer 10d plays a role of a base layer that controls the magnetization orientation and particle diameter of the magnetic recording layer 10e.

A ferromagnetic resonance frequency FR of the magnetic recording layer 10e has an intrinsic value determined by the shape, size, constituent elements, and the like of magnetic particles that constitute the magnetic recording layer 10e, and is on the order of from about 5 GHz to about 50 GHz.

A microwave magnetic field is generated around the microwave magnetic field generating element 43 by causing a microwave drive current to flow through a line conductor that constitutes the microwave magnetic field generating element 43. Since the microwave magnetic field generating element 43 is near a magnetic recording medium, a resonance magnetic field 80 is applied in an almost in-plane direction in the magnetic recording medium of the recording medium. This resonance magnetic field 80 is a high frequency magnetic field of a microwave band from about 5 GHz to about 50 GHz, the microwave band including the ferromagnetic resonance frequency FR of the magnetic recording layer 10e of the magnetic recording medium 10 or frequencies around the ferromagnetic resonance frequency FR.

The coercivity of the magnetic recording layer 10e may be efficiently reduced by superimposing the resonance magnetic field 80 on a perpendicular recording magnetic field 81, which is applied to the magnetic recording layer by the main magnetic pole layer $31b_1$ of the recording head element 31b. As a result, the strength of a recording magnetic field may be significantly reduced in a perpendicular direction necessary for recording (in a direction that is perpendicular to or almost perpendicular to a surface of the magnetic recording layer 10e). As a result of reducing coercivity, magnetization reversal occurs more easily. Thus, recording may be efficiently performed with a smaller recording magnetic field.

Here, the microwave magnetic field generating element 43 is arranged between the main magnetic pole layer $31b_1$ and the trailing shield portion $31b_{51}$ and on the same plane as a surface of the ABS 30a; however, as long as the resonance magnetic field 80 having a strength necessary for magnetization reversal is obtained, the microwave magnetic field generating element 43 may be arranged at any position.

Figure 13:
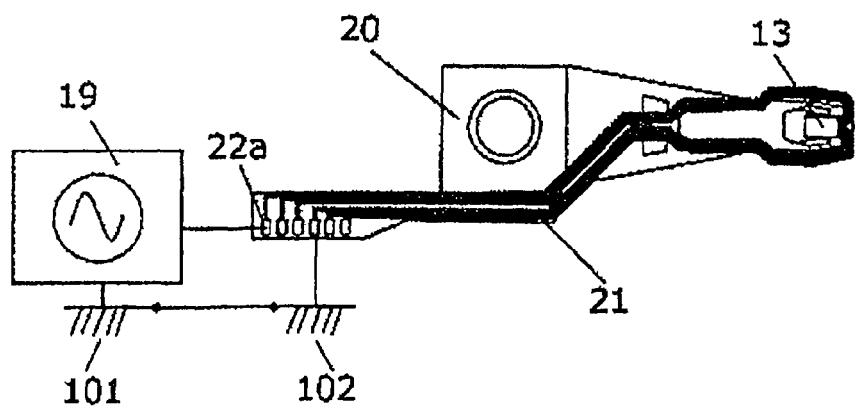
FIG. 13 is a block diagram of a circuit of a conventional example.
Figure 14:
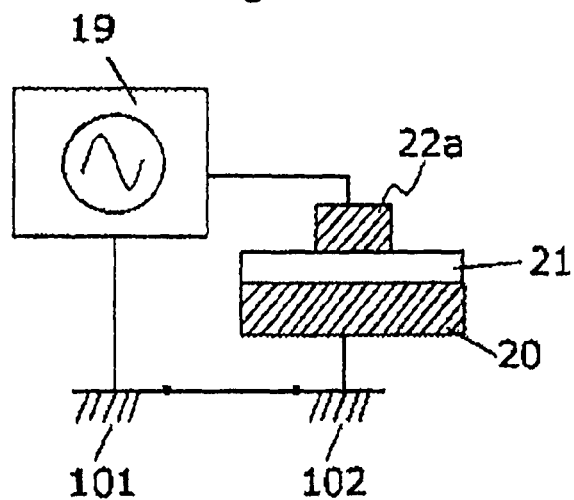
FIG. 14 is a schematic block diagram of a circuit of the conventional example.

FIG. 13 illustrates a block diagram in a conventional microwave transmission method and FIG. 14 illustrates a schematic diagram of a section of a flexure in the conventional microwave transmission method. Microwave power generated from the microwave power generator 19 is connected to a microwave transmission line, which is denoted by 22a. A ground potential 101 of the microwave power generator 19 and a ground potential 102 of the flexure and a base plate are electrically connected, and microwave power transmits through the transmission line 22a.

Figure 15:
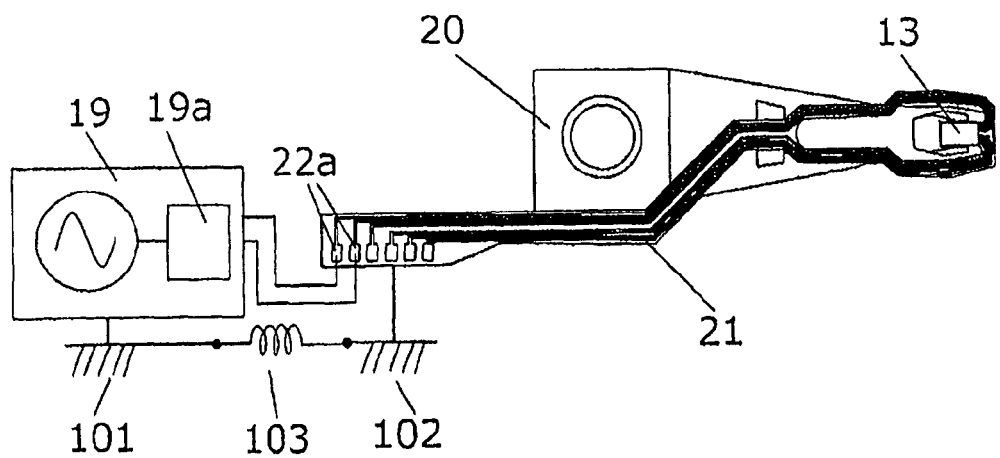
FIG. 15 is a block diagram of a circuit of the present invention.
Figure 16:
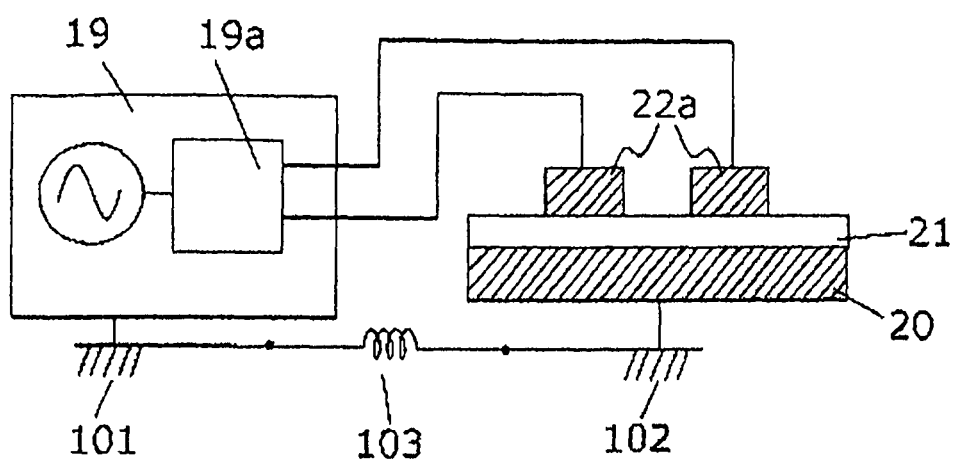
FIG. 16 is a schematic block diagram of a circuit of the present invention.

FIG. 15 illustrates a block diagram in a microwave transmission method of the present invention and FIG. 16 illustrates a schematic diagram of a section of a flexure in the microwave transmission method of the present invention. Microwave power generated from the microwave power generator 19 is converted into differential signals whose phases differ from each other by 180° using the differential signal supply unit 19a such a rat race circuit, a balun, or as a splitter and phase shifter built in the microwave power generator 19. Microwave differential signals generated by the differential signal supply unit 19a are connected to electrodes of one and the other of the transmission lines 22a on the flexure, propagate on the flexure, pass through wiring lines 41 and 42 provided in the magnetic head slider 13, and are supplied to the microwave magnetic field generating element 43.

Here, the ground potential 101, which is the ground potential of the microwave power generator 19, and the ground potential 102, which operates as a ground electrode and is the ground potential of a flexure 20, are connected to a high frequency isolation element 103, and are isolated by this isolation element 103 at any frequency in a range from about 5 GHz to about 50 GHz, in which a microwave assistance effect may be expected. In addition, the isolation element 103 is illustrated as an inductor in FIGS. 15 and 16; however, any element that realizes isolation may be used such as a feedthrough capacitor or the like.

Figure 17:
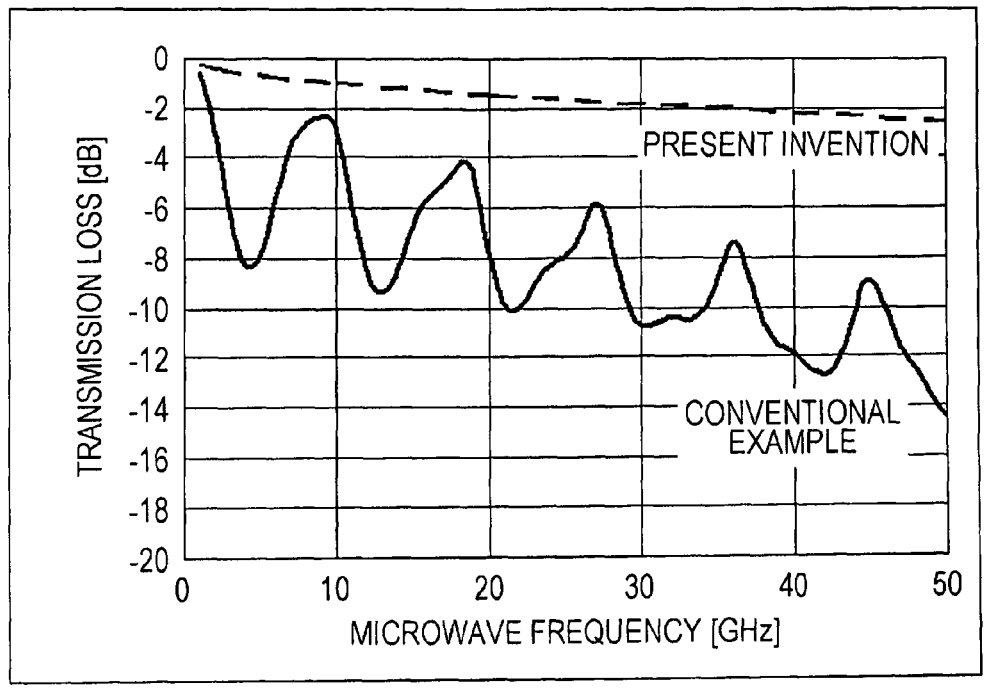
FIG. 17 illustrates a transmission characteristic simulation (ground isolation) of the present invention and that of a conventional example.

In the present embodiment, signals are transmitted through the microwave power transmission lines 22a in a differential signal manner and the flexure 21 serving as a ground electrode is isolated in high frequencies. Thus, the amount of transmission loss is further suppressed, and necessary microwave power can be supplied to the microwave magnetic field generating element 43. In addition, FIG. 17 illustrates transmission loss in the case where a ground is not isolated in FIG. 15 and FIG. 16. In the case where a ground is not isolated, for example, a transmission loss of 10 dB is obtained at 30 GHz, and a transmission loss of approximately 2 dB is obtained in the present invention.

Here, wiring lines on the flexure are not straight lines but curved lines, and the phase difference of power to be transmitted through two microwave transmission lines 22a may be shifted from 180°, which is the phase difference of differential transmission. When the phase difference is shifted from 180°, the microwave power output from the microwave power generator 19 may not be efficiently supplied as a current that is caused to flow through the microwave magnetic field generating element 43, which is arranged at the tip of the magnetic head.

When the phase shift is 0 (in the case where the phase difference between transmission lines denoted by 22a is 180° in differential driving), the current to be supplied to the microwave magnetic field generating element 43 is largest and a magnetic field to be generated is strongest. For this case, the current supplied to the microwave magnetic field generating element 43 here is set to 100%.

Figure 18:
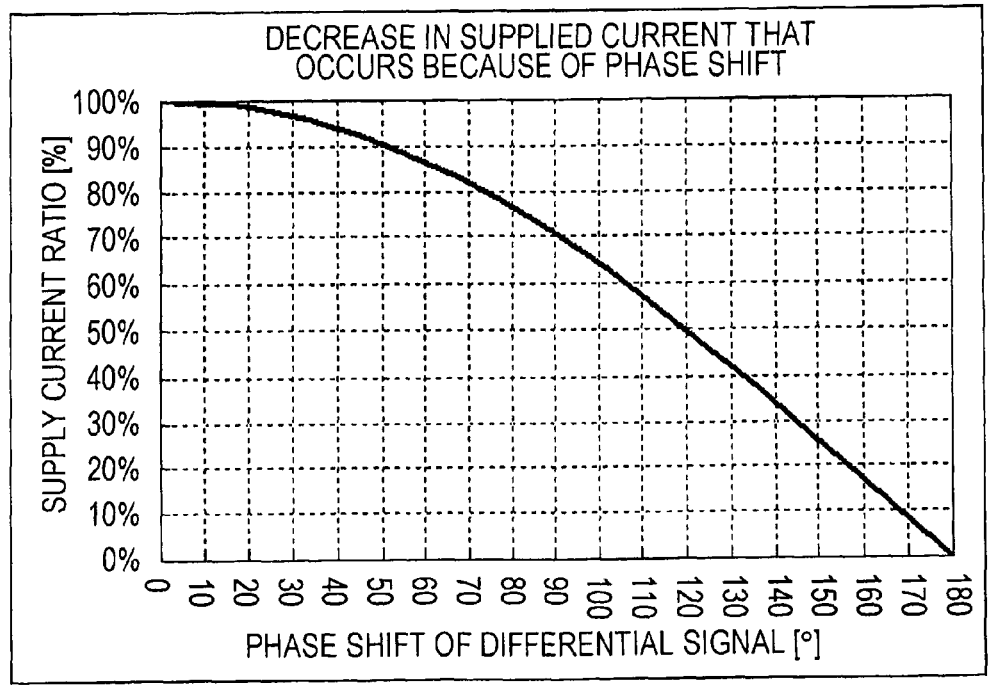
FIG. 18 illustrates a supply current ratio caused by a phase shift.

However, when a phase shift occurs in differential transmission, the amount of current to be supplied to the microwave magnetic field generating element 43 decreases. FIG. 18 illustrates a relationship between a phase shift that has occurred and the value of current to be supplied to the microwave magnetic field generating element 43.

From FIG. 18, if the phase shift is within 50°, a decrease in the supply current falls in a range in which the supply current is reduced by approximately 10%, and thus it is desirable that the phase shift be within 50°.

Furthermore, in the case where unnecessary loss or reflection has occurred in only one of the microwave power transmission lines 22a, there may be a power difference between differential lines. When a power difference occurs, the microwave power output from the microwave power generator 19 may not be efficiently supplied as a current that is caused to flow through the microwave magnetic field generating element 43, which is arranged at the tip of the magnetic head.

Figure 19:
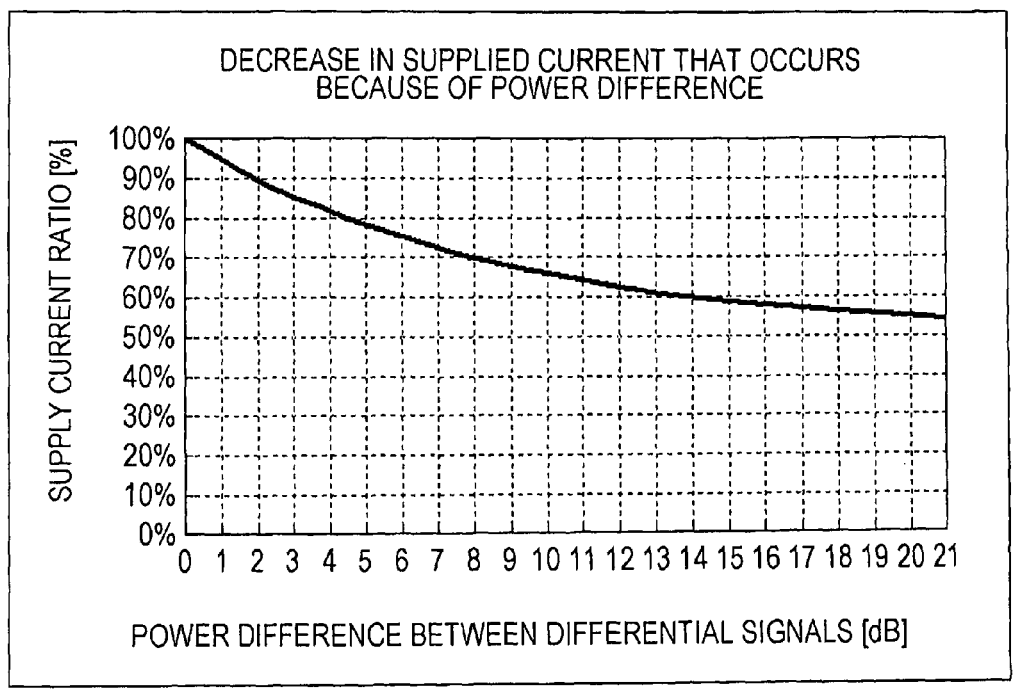
FIG. 19 illustrates a supply current ratio caused by a power difference.

FIG. 19 illustrates a relationship between a power difference and a current to be supplied to the microwave generating element 43. When the power difference is 0, the value of current to be supplied to the microwave magnetic field generating element 43 is largest and the value of current here is set to 100%. When a power difference occurs between differential lines, a supply current decreases.

From FIG. 19, if the power difference is within 2 dB, a decrease in the supply current is kept within approximately 10%, and thus it is desirable that the power difference be within 2 dB.

Preferred embodiments of the present invention have been specifically illustrated and described; however, it is to be understood that various changes and modifications are permissible without departing from the gist or scope of attached claims.

The present invention relates to a thin film magnetic head to be used in a microwave assisted magnetic recording technology in which data is written into a magnetic recording medium by superimposing a microwave magnetic field on a head signal recording magnetic field, and furthermore may be used in a magnetic recording and reproducing apparatus using this technology.

Reference Signs List

9 . . . suspension, 10 . . . magnetic recording medium (magnetic disk), 10a . . . disk substrate, 10b . . . magnetic orientation layer, 10c . . . soft magnetic backing layer, 10d . . . intermediate layer, 10e . . . magnetic recording layer, 10f . . . protection layer, 11 . . . spindle motor, 11a . . . spindle motor rotation axis, 12 . . . head gimbal assembly (HGA), 13 . . . magnetic head slider, 14 . . . VCM (voice coil motor), 15 . . . pivot bearing axis, 16 . . . carriage, 17 . . . head arm assembly, 18 . . . drive arm, 19 . . . microwave power generator, 19a . . . differential signal supply unit, 20 . . . load beam, 21 . . . flexure, 21a . . . flexure main body portion, 21b . . . flexure coupling portion, 21c . . . supporting portion, 22 . . . transmission line, 22a . . . microwave power transmission line, 22b . . . recording signal transmission line, 22c . . . reproducing signal transmission line, 22d . . . heater-use transmission line, 23 . . . base plate, 24 . . . separate supporting unit, 30 . . . magnetic head slider substrate, 30a . . . ABS (Air Bearing Surface), 30b . . . element forming surface perpendicular to ABS 30a, 31 . . . magnetic head element, 31a . . . magnetoresistance effect (MR) reproducing head element, 31b . . . recording head element, 30d . . . magnetic head slider end face, $31a_1$ . . . MR multilayer product, $31a_2$ . . . bottom portion shield layer, $31a_3$ . . . top portion shield layer, $31b_1$ . . . main magnetic pole layer, $31b_2$ . . . trailing gap layer, $31b_3$ . . . write coil, $31b_4$ . . . write coil insulating layer, $31b_5$ . . . auxiliary magnetic pole layer, $31b_6$ . . . auxiliary shield layer, $31b_7$ . . . leading gap layer, $31b_{11}$ . . . main magnetic pole yoke layer, $31b_{12}$ . . . main magnetic pole main layer, $31b_{51}$ . . . trailing shield portion, $31b_{61}$ . . . leading shield portion, 32 . . . protection unit, 33, 34, 35, 36, 37, 38, 39, and 40 . . . terminal electrode, 41 and 42 . . . wiring member, 43 . . . microwave magnetic field generating element, 50 . . . insulating layer, 80 . . . resonance magnetic field, 101 . . . ground, 102 . . . ground of flexure, 103 . . . high frequency isolation element

What is claimed is:

1. A microwave-assisted magnetic recording and reproducing apparatus, comprising:
   a magnetic recording medium;
   a magnetic head that records information in the magnetic recording medium;
   a microwave power generator provided independently of the magnetic head; and
   a differential signal supply unit used to supply microwave power generated by the microwave power generator as differential signals to a microwave magnetic field generating element provided at the magnetic head.

2. The microwave-assisted magnetic recording and reproducing apparatus according to claim 1, wherein the microwave power generator and the microwave magnetic field generating element are connected by microwave transmission lines, and
   for a ground potential of the microwave power generator and a ground potential of the microwave transmission lines and the microwave magnetic field generating element, isolation is realized in a microwave range.

3. The microwave-assisted magnetic recording and reproducing apparatus according to claim 1, wherein in a case where the microwave power supplied from the microwave power generator is supplied as differential signals to the microwave magnetic field generating element provided at the magnetic head, a phase shift between both ends of the microwave transmission lines is within 50°.

4. The microwave-assisted magnetic recording and reproducing apparatus according to claim 1, wherein in a case where the microwave power supplied from the microwave power generator is supplied as differential signals to the microwave magnetic field generating element provided at the magnetic head, a power difference between both ends of the microwave transmission lines is within 2 dB.

5. The microwave-assisted magnetic recording and reproducing apparatus according to claim 1, wherein a frequency of the microwave power is between 5 GHz and 50 GHz.

6. The microwave-assisted magnetic recording and reproducing apparatus according to claim 1, comprising:
   the magnetic head and a reproducing head, wherein
   the microwave power supplied from and generated by the microwave magnetic field generating element is superimposed, at a signal recording portion of the magnetic recording medium, on a signal recording magnetic field from a main magnetic pole of the magnetic head.

7. A device for microwave-assisted magnetic recording, comprising: a magnetic head that records information in a magnetic recording medium; a microwave power generator provided independently of the magnetic head; and a differential signal supply unit used to supply microwave power generated by the microwave power generator as differential signals to a microwave magnetic field generating element provided at the magnetic head.

8. The device for microwave-assisted magnetic recording according to claim 7, wherein the microwave power generator and the microwave magnetic field generating element are connected by microwave transmission lines, and for a ground potential of the microwave power generator and a ground potential of the microwave transmission lines and the microwave magnetic field generating element, isolation is realized in a microwave range.

* * * * *